April 3, 1945.   R. E. BEEGLE   2,372,703
BRAKE MECHANISM FOR RAILWAY VEHICLES
Filed Aug. 28, 1942   2 Sheets-Sheet 2

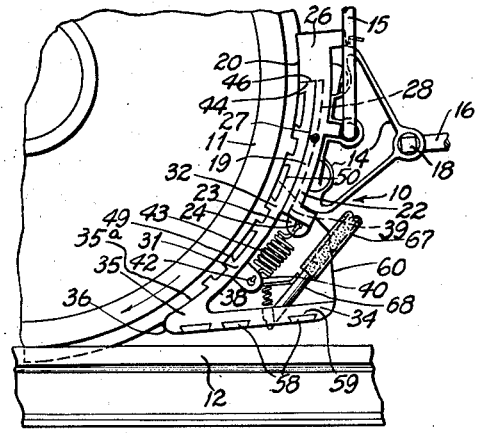

INVENTOR.

Patented Apr. 3, 1945

2,372,703

UNITED STATES PATENT OFFICE 2,372,703

BRAKE MECHANISM FOR RAILWAY VEHICLES

Raymond E. Beegle, East St. Louis, Ill.

Application August 28, 1942, Serial No. 456,725

5 Claims. (Cl. 188—36)

This invention relates to improvements in brake mechanism for railway vehicles and the like, and has particular reference to a novel brake device affording increased braking action on a vehicle wheel and additional braking on the wheel supporting rail.

The principal object of the invention is to provide a novel brake mechanism characterized by an improved wheel brake shoe assembly and a rail brake shoe forming a part of the assembly, wherein the improvements attained are such that the mechanism affords efficient and highly effective railway vehicle braking under all vehicle operating conditions.

A further object is to provide improved rail-sanding means in association with the rail brake of the braking mechanism, operative to sand the rail in response to displacement of the rail brake toward braking engagement with the rail.

Additional objects and advantages of the present invention will appear readily from the following description of a preferred embodiment of the invention, as exemplified in the accompanying drawings, wherein:

Fig. 1 is an assembly view in side elevation of a preferred embodiment of my improved brake mechanism, the brake here being shown in free or non-braking relation to a railway vehicle wheel and the wheel rail;

Fig. 2 is a view similar to that of Fig. 1, but illustrating the brake in braking engagement with the wheel only;

Fig. 3 is a view similar to that of Fig. 1, but here illustrating the brake actuated into braking engagement with both the wheel and wheel rail;

Fig. 4 is an enlarged end view of the brake, showing the brake-shoe face thereof;

Fig. 5 is a side elevation of the brake;

Fig. 6 is a sectional view transversely of the brake, as taken from the line 6—6 in Fig. 4;

Fig. 7 is a another transverse sectional view, as taken along the line 7—7 in Fig. 4;

Fig. 8 is a further transverse section through the brake, as viewed from the line 8—8 in Fig. 5;

Fig. 9 is a further transverse sectional view of the brake, as taken from line 9—9 in Fig. 5;

Figure 10:
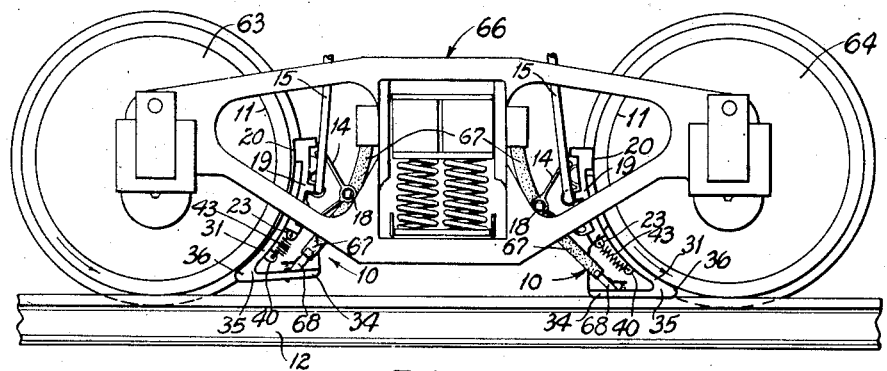
Fig. 10 illustrates in side elevation, a railway vehicle truck, having the presently improved brake mechanism in operative association with the truck wheels.

Referring to the drawings by appropriate characters of reference, the improved brake mechanism designated generally by the numeral 10, is illustrated in application to a railway vehicle wheel 11 engaging a rail 12. The brake may be operatively supported by the usual or any suitable form of brake rigging, which is here shown in part only, as including a brake-shoe supporting frame or head 14 movably suspended from the vehicle (not shown) by a supporting arm or link 15, and brake actuating arm 16 which may be one arm of a brake operating toggle assembly (not shown) commonly employed for this purpose, the arm 16 being operatively connected to frame 14 as at 18. A brake shoe member 19 having a wheel braking surface 20 at its upper end, is suitably secured to the frame or head 14. At its lower end 22, the shoe 19 is provided with a projecting lug 23 which is apertured at 24, the apertured lug serving a purpose presently to appear.

The shoe member 19 is of arcuate trend over its longitudinal extent, and is reduced in its transverse dimension or thickness, from the upper or head portion 26 which provides the braking face 20, to the lower end 22, substantially as shown. Extending longitudinally and centrally of the reduced portion 27 in the forward face thereof, is a groove or channel 28 which by preference, has its opposite sides under-cut, as at 30 (Fig. 8).

A brake-shoe frame 31 of somewhat V-shape in side elevation (Fig. 5) is carried by the member 19, and provides an upstanding arcuate arm 32 and a substantially straight or rectilinear arm 34 below the arm 32, the arms being joined by a solid portion 35 having a rounded forward end or nose 36. On the rear face 38 of arm 32 and extending longitudinally over the upper end portion thereof, is a dove-tailed projection 39 adapted for sliding reception in the under-cut channel 28. Also projecting from the rear face 38 of arm 32 and near the lower end thereof, is a lug 40 having an aperture 42 therein. A suitable coiled tension spring 43 has one end engaged in the aperture 42 of lug 40, and its opposite end engaged in the aperture 24 of lug 23 on the member 19. Thus the arm 32 and hence the frame 31, is operatively supported by the member 19 through spring 43 and the dove-tailed joint 28—39. As will be now observed, particularly from the view of Fig. 1, the spring 43 being of suitable tensional capacity, normally serves to draw the frame 31 upwardly, through the sliding engagement of the arm 32 with the member 19, into an initial or normal position wherein the upper end 44 of arm 32 abuts a shoulder 46 formed by the head 26. In such position of the frame 31, the lower arm 34 is appreciably clear of the wheel rail 12. As presently preferred, downward movement of the frame 31 as effected in a manner hereinafter appearing, is limited in a positive manner by a removable stop pin 47 (Fig. 9) extending transversely of the channel 28 in an intermediate portion of member 19. Accommodating the pin 47 is a recess or slot provided in the dove-tail projection 39 on arm 32, as indicated in broken lines at 48, the slot being of such longitudinal extent as to permit downward movement of arm 32 sufficiently to provide for effective rail braking, as will hereinafter appear. It may be noted here that suitable rollers or the like (not shown) may be employed in the sliding connection of arm 32 and member 19, to afford smooth and easy movement of the arm 32.

In the forward or exposed side 49 of arm 32 are formed a plurality of under-cut transverse grooves or recesses 50, in each of which is placed a removable brake shoe element or block 51. These provide the wheel-engaging braking surfaces of the brake arm 32, and each may be suitably secured in its recess as by screws 52 (Fig. 6). An alternate manner of securing each shoe 51 to the arm 32 in its recess 50, is illustrated by Fig 7, wherein is shown a cotterpin 54 extended transversely of the arm 32 centrally through the base portion of the shoe block. The cotter pin head 55 and its spread end 56 over-lap the edges of the block and arm 32, and thus effectively retain the block in place.

In a similar manner, brake shoe blocks 58 are secured in recesses 59 formed in the under surface of the frame arm 34, these blocks serving to provide braking surfaces for engagement with the rail 12.

A strengthening connection between the frame arms 32 and 34 may be provided by a side plate 60, as illustrated. The frame 31 is preferably an integral structure and may be a single steel casting including the strengthening plate 60, to afford economy of manufacture as will be appreciated.

The present wheel brake structure affords contact with the wheel tire or tread surface over a relatively wide arc, as shown, so as to improve the distribution of the braking forces on the wheel. However, the provision of the relatively spaced brake shoe blocks 51 in the brake arm 32, is effected in order to reduce the braking surface contact with the wheel tread to a degree such that, while affording a fully effective braking function of the brake on the wheel, the brake will not cause either intermittent or full locking of the wheel even when the braking action is a maximum. Wheel locking, of course, usually results in a flattening of the wheel portion in engagement with the rail, a condition which is very undesirable as will be understood.

In railway braking, a condition sometimes arises whereby by reason of the frictional heat developed by hard or maximum braking, the surface metal of the brake shoes 51 tends to become molten or plastic. This condition is generally termed "flaming," and usually results in the separation of small particles of shoe metal. If not cared for, these metal particles ultimately become embedded in the brake shoe surfaces, thereby tending to increase the frictional braking capacity of the shoes to an undesirable degree, which may result in wheel-locking during braking operation. In order to overcome this difficulty, the brake arm 32 is notched or recessed, as at 61, between each adjacent pair of shoe blocks 51 (Fig. 5), these recesses thus providing receiving pockets for bits of metal resulting from "flaming." The actual delivery of the metal particles to the pockets is effected by the shoes 51 which in contact with the wheel tread, scrape the particles directly into the pockets, as will be now appreciated.

To this end also, a number of grooves 62 are provided in the braking face 20 of the brake head 26 (Fig. 4) these grooves preferably being directed diagonally of the face 20, as shown. The metal particles collecting in the grooves 62 and the grooves 61 in arm 32, may be readily removed at suitable intervals, as will be understood.

The operation of my improved brake is such that in preliminary or normal braking, the brake mechanism will be functionally related to the wheel substantially as illustrated in Fig. 2. As there shown, the braking surface 20 of the brake head 26 and the blocks 51 of arm 32, frictionally engage the wheel 11, with the arm 32 in its upper position wherein the upper end 44 thereof abuts the shoulder 46 on head 26. Now upon increasing the braking pressure through further actuation of the brake control rod 16 (the brake being on the left-hand side of the wheel (Fig. 3), with the latter rotating in the clockwise direction, as indicated by the arrow in Fig. 3), the resulting increased frictional engagement between the wheel and brake shoes 51 on arm 32, will tend to cause downward displacement of the arm 32 against the return force of spring 43. As maximum wheel-braking is approached, displacement of arm 32 will be sufficient to bring the shoes 58 of the rail brake arm 34 into braking engagement with the rail 12, whereby to augment the wheel braking by an effective braking against the wheel rail. The position of the mechanism for maximum wheel and rail braking, is illustrated by Fig. 3, wherein the shoes 58 are in full-face contact with the rail. It is to be understood, however, that the major braking function of the present mechanism is against the vehicle wheel 11, and that rail-braking by the rail-brake portion thereof is effected only to a secondary degree which is wholly insufficient to cause hard braking or "freezing" of the shoes 58 to the rail 12, as otherwise, the rail brake might tend to lift the wheel in a de-railing action. Any such effect is further guarded against, in case the rail brake should strike an uneven rail joint, by beveling, rounding or chambering the outermost or free margin of the rail brake shoe, as shown. It is to be noted that the forward or toe section 35—36 of the rail brake is devoid of wheel brake shoe elements such as the shoes 51, and further, is undercut as at 35—a below the frame surface or face 49 (Fig. 5), so that this section will be at all times free of wheel engagement. This latter feature definitely avoids any tendency for the rail brake to become wedged between the wheel and rail, and hence serves additionally, to preclude any de-railing action of the brake.

Upon brake-release, the spring 43 will effectively return the movable brake structure to its initial or normal position, as shown in Fig. 1 or Fig. 2, the latter showing the mechanism in initial wheel-braking position, with the brake entirely clear of the rail 12.

Fig. 10 illustrates the application of my improved brake to each of the adjacent wheels 63 and 64 of a railway vehicle truck designated generally by the numeral 66. Assuming the direction of vehicle travel to be such that the wheels rotate in the counter-clockwise direction, as indicated by the arrows on each wheel, only the right-hand brake in association with wheel 64, may be actuated through frictional contact with the wheel, to bring the rail brake portion thereof into braking engagement with the rail, as shown. The reason for this has been made clear hereinabove. The left-hand brake in association with wheel 63, therefore functions only upon the wheel, since by reason of the direction of wheel rotation, the frictional forces resulting from braking engagement of the blocks 51 with the wheel tread, tend to lift the frame 31 and hence move the rail brake arm 34 upwardly away from the rail. Thus rail-braking of the left-hand brake cannot readily occur. However, upon reversal of vehicle movement, the functions of the brakes in respect to the rail braking portions thereof, are relatively reversed, as will be now appreciated.

Figure 11:
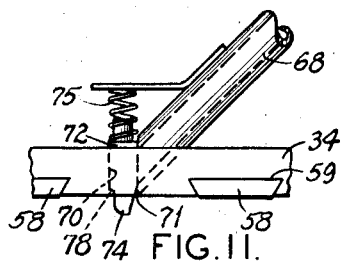
Figs. 11 and 12 are enlarged views of the rail sanding means on the brake, illustrating respectively the sanding valve in closed and open positions.
Figure 12:
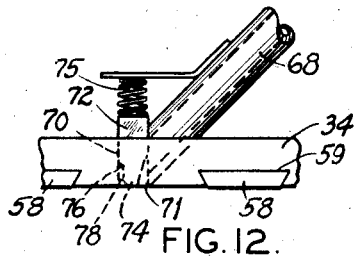

A further feature of the present improved brake mechanism resides in a provision for sanding the rail automatically prior to and as the rail brake 34 approaches braking engagement with the rail. To this end, sand from a suitable source of supply on the railway vehicle (not shown) is conducted through a flexible hose or conduit 67 (Fig. 1), to and through a short tube 68 (to which which the hose is connected) secured to the frame arm 34 (Fig. 11). The lower end of tube 68 communicates with a passage 70 in the arm 34 opening on the underside of the latter as at 71, and hence above the wheel-engaging surface of the rail 12, for direct delivery of sand onto the rail. A valve element 72 controls communication between tube 68 and the passage 70, and normally has its lower end 74 projecting downwardly through the sanding opening 71 in arm 34, being urged thereto, under the influence of a biasing spring 75. Downward projection of the valve element to close the passage 70 and to extend the valve end 74 below the brake arm 34, may be limited in any suitable manner, as by cooperating abutments or shoulders 76 and 78 formed respectively on the valve element and in the passage 70. From the foregoing, it will be observed that as the brake arm approaches the rail 12, the projecting end 74 of the valve 72 will abut the rail and thereby lift the valve. Lifting of the valve results in opening of the passage 70 to the tube 68 and its discharge opening 71 (Fig. 12) to permit discharge of sand onto the rail. Thus the sanding provision is made automatically responsive to movement of the rail brake toward rail engagement.

Figure 13:
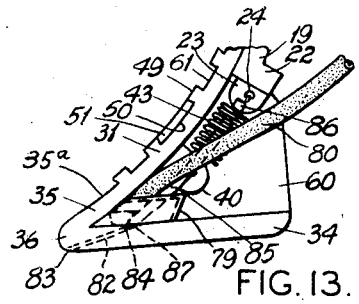
Figs. 13 and 14 are enlarged fragmentary views of the brake, showing a modified form of sanding control means on the brake, the views illustrating respectively, the control valve in closed and open positions.
Figure 14:
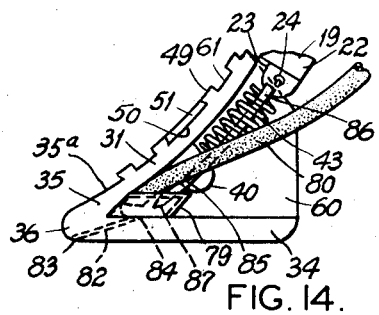

A modification in the sanding arrangement is shown by Figs. 13 and 14, wherein a sand receiving chamber 79 supplied through a flexible hose 80 from a suitable source on the vehicle (not shown) is located by preference in the apex-zone of the brake arms 32 and 34. A sanding passage 82 open on the under side 83 of the brake arm 34, communicates with the chamber 79 through a port 84. A port-controlling valve rod 85 has its upper end 86 secured to the spring lug 23 on brake shoe member 19, and its lower pointed end 87 slidingly received in the chamber 79 for controlling the port 84. When the movable brake frame 31 is in its normal or uppermost position (Fig. 13), the pointed end 87 of rod 85 is received in the port 84 to close the same. However, upon braking displacement of the frame 31 downwardly relative to the shoe member 19, the port 84 will be moved from the rod end 87 (Fig. 14) so as to open the passage 82 for the discharge of sand onto the rail.

The arrangements of Figs. 11-12 and 13-14 thus provide for automatic rail sanding in response to movement of the rail brake toward rail engagement. In each embodiment it will be noted that the degree of valve opening increases proportionately to movement of the rail brake toward the rail, so that maximum rail sanding is effected just prior to or as the rail brake engages the rail in the instance of the device shown by Figs. 11 and 12, and may continue during rail braking in the instance of the arrangement shown by Figs. 13 and 14. Thus maximum rail sanding occurs when the greatest need therefor is present, as when maximum braking is desired.

It is to be understood that modification of the presently improved brake mechanism, may be effected without departing from the scope and full intendment of the invention, as defined by the appended claims.

I claim:

1. A brake mechanism for a railway vehicle, comprising a vehicle supported wheel brake member adapted for braking engagement with a wheel of the vehicle, a second wheel brake member provided for braking engagement with the wheel and supported by the first said member for movement relative thereto, means yieldably positioning said second member in an initial position relative to the first member, and a rail brake member carried by one of said wheel brake members, engageable with the supporting rail upon movement of said second wheel brake member from its intial position.

2. A brake mechanism for a railway vehicle, comprising relatively movable wheel brake members each adapted for braking engagement with a wheel of the vehicle, yieldable means normally relating said members in an initial relative position, and a rail brake member supported by one of said wheel brake members, engageable with the supporting rail upon relative movement of the wheel brake members from said intial relative position.

3. A brake mechanism for a railway vehicle, comprising a wheel-engaging brake member, a second wheel-engaging brake member supported by the first said member for movement relative thereto, in a direction circumferentially of the wheel, a spring yieldably positioning said second member in an initial position relative to the first said member, and a rail-engaging brake member carried by said second brake member, engageable with the supporting rail upon movement of the second brake member from its intial position, at least two of said brake members each including relatively spaced friction elements affording the braking surface.

4. A brake mechanism for a railway vehicle, comprising a wheel-engaging brake member movable toward and from braking engagement with a wheel, a second wheel-engaging brake member carried by the first said member for movement therewith and being movable relative to the latter in a direction circumferentially of the wheel, means including a spring interconnecting said members, adapted for limiting said relative movement of the second brake member, and a rail-engaging brake member integral with one end of said second brake member, engageable with the supporting rail upon movement of said second brake member.

5. A brake mechanism for a railway vehicle, comprising a wheel-engaging brake member, a second wheel-engaging brake member supported by the first said member for movement relative thereto and in a direction circumferentially of the wheel, in response to frictional engagement of the second member with the wheel, means yieldably positioning said second member in an initial position relative to the first said member, and effective to restrain any substantial movement of the second member from said initial position during a predetermined minimum frictional engagement of said members with the wheel, and a rail-engaging brake member carried by said second member in a position for rail engagement upon substantial movement of the second brake member from its initial position, effected in response to frictional engagement of said second member with the wheel to a degree such as to produce substantially maximum wheel-braking thereby.

RAYMOND E. BEEGLE.